US012658565B2

(12) United States Patent
Son et al.

(10) Patent No.: US 12,658,565 B2
(45) Date of Patent: Jun. 16, 2026

(54) ELECTRONIC DEVICE COMPRISING RADIATING ELEMENT

(71) Applicant: Samsung Electronics Co., Ltd., Suwon-si (KR)

(72) Inventors: Moonsoo Son, Suwon-si (KR); Jeongwan Park, Suwon-si (KR); Min Sakong, Suwon-si (KR); Gyubok Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 18/668,762

(22) Filed: May 20, 2024

(65) Prior Publication Data

US 2024/0313389 A1 Sep. 19, 2024

Related U.S. Application Data

(63) Continuation of application No. PCT/KR2022/017446, filed on Nov. 8, 2022.

(30) Foreign Application Priority Data

Dec. 2, 2021 (KR) ........................ 10-2021-0170685

(51) Int. Cl.
*H01Q 1/24* (2006.01)
*H01Q 1/46* (2006.01)
*H01Q 1/48* (2006.01)

(52) U.S. Cl.
CPC ............... *H01Q 1/243* (2013.01); *H01Q 1/46* (2013.01); *H01Q 1/48* (2013.01)

(58) Field of Classification Search
CPC ............. H01Q 1/243; H01Q 1/46; H01Q 1/48
See application file for complete search history.

(56) References Cited

U.S. PATENT DOCUMENTS 9,196,964 B2 * 11/2015 Baringer .............. A61B 5/4812
11,942,690 B2 * 3/2024 Yun ........................ H01Q 21/08

(Continued)

FOREIGN PATENT DOCUMENTS

CN 112635974 A 4/2021
KR 10-2009-0031108 A 3/2009

(Continued)

OTHER PUBLICATIONS

International Search Report dated Feb. 8, 2023, issued in International Application No. PCT/KR2022/017446.

(Continued)

*Primary Examiner* — Thien M Le
(74) *Attorney, Agent, or Firm* — Jefferson IP Law, LLP

(57) ABSTRACT

An electronic device is provided. The electronic device includes a housing including a first plate facing a first direction, a second plate facing a second direction opposite to the first direction, and a side member formed facing a third direction so as to surround a space between the first plate and the second plate, a gap region formed by spacing apart or segmenting at least a portion of the housing, a printed circuit board (PCB) disposed inside the housing, an antenna structure including a power feeding portion and a grounding portion, at least a portion of the antenna structure being electrically connected to the PCB, and a radiating element electrically connected to the power feeding portion or the grounding portion, the radiating element being positioned such that at least a portion of the radiating element overlaps the gap region when the electronic device is viewed in the first direction, the second direction, or the third direction.

14 Claims, 12 Drawing Sheets

(56) References Cited

U.S. PATENT DOCUMENTS

| | | | | |
|---|---|---|---|---|
| 12,266,856 | B2 * | 4/2025 | Jeon | H01Q 13/18 |
| 2014/0266939 | A1 * | 9/2014 | Baringer | H01Q 1/22<br>343/729 |
| 2016/0218422 | A1 * | 7/2016 | Choi | H01Q 1/243 |
| 2017/0048366 | A1 * | 2/2017 | Jeong | H04M 1/0277 |
| 2017/0111077 | A1 * | 4/2017 | Hwang | H01Q 1/243 |
| 2017/0141820 | A1 * | 5/2017 | Kim | H04B 1/40 |
| 2017/0309991 | A1 | 10/2017 | Noori et al. | |
| 2018/0026337 | A1 | 1/2018 | Chen et al. | |
| 2020/0015701 | A1 * | 1/2020 | Wei | A61B 5/332 |
| 2020/0153115 | A1 * | 5/2020 | Yun | H01Q 9/0407 |
| 2025/0263952 | A1 * | 8/2025 | Uyeda | E05B 47/06 |

FOREIGN PATENT DOCUMENTS

| | | | |
|---|---|---|---|
| KR | 10-1472371 | B1 | 12/2014 |
| KR | 10-2016-0105102 | A | 9/2016 |
| KR | 10-2018-0085469 | A | 7/2018 |
| KR | 10-1962001 | B1 | 3/2019 |
| KR | 10-2019-0102895 | A | 9/2019 |
| KR | 10-2019-0116884 | A | 10/2019 |
| KR | 10-2019-0131112 | A | 11/2019 |
| KR | 10-2020-0036460 | A | 4/2020 |
| KR | 10-2020-0123859 | A | 10/2020 |
| KR | 10-2231232 | B1 | 3/2021 |

OTHER PUBLICATIONS

European Search Report dated Feb. 11, 2025, issued in European Application No. 22901602.7.
Korean Office Action dated Feb. 12, 2026, issued in Korean Application No. 10-2021-0170685.

* cited by examiner

ELECTRONIC DEVICE COMPRISING RADIATING ELEMENT

CROSS-REFERENCE TO RELATED APPLICATION(S)

This application is a continuation application, claiming priority under § 365(c), of an International application No. PCT/KR2022/017446, filed on Nov. 8, 2022, which is based on and claims the benefit of a Korean patent application number 10-2021-0170685, filed on Dec. 2, 2021, in the Korean Intellectual Property Office, the disclosure of which is incorporated by reference herein in its entirety.

BACKGROUND

1. Field

The disclosure relates to an electronic device including a radiating element.

2. Description of Related Art

An electronic device supporting a wireless communication is equipped with an antenna for transmitting and receiving a signal in a designated frequency range. In a case of a small-sized electronic device such as a smartphone, an antenna structure using a metal portion, which forms an appearance, may be mounted, and various techniques to mount such an antenna structure, for example, a loop antenna, an inverted-F antenna, a mono antenna, or a slit antenna may be used. Recently, with an increase in frequency bands, a case in which one electronic device transmits and receives signals corresponding to several frequencies is increasing. To implement signals of various frequency bands, it is considered to use several metal portions of the electronic device.

The above information is presented as background information only to assist with an understanding of the disclosure. No determination has been made, and no assertion is made, as to whether any of the above might be applicable as prior art with regard to the disclosure.

SUMMARY

In order to improve performance of an antenna, a gap region formed on a side member and/or a gap region formed between the side member and a rear plate may be used as a radiating position of a signal. However, the number of gap regions may be limited according to miniaturization of the electrode and improvement of a component density. In addition, a radiating direction may be limited to a side and/or rear direction since the gap region is generally formed in the side direction and/or the rear direction.

Aspects of the disclosure are to address at least the above-mentioned problems and/or disadvantages and to provide at least the advantages described below. Accordingly, an aspect of the disclosure is to provide an electronic device having improved radiating performance using a radiating element disposed adjacent to a gap region.

Another aspect of the disclosure is to provide an electronic device having an improved radiating pattern by using radiation in a front direction.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first plate facing a first direction, a second plate facing a second direction opposite to the first direction, and a side member formed facing a third direction to surround a space between the first plate and the second plate, a gap region formed by spacing apart or segmenting at least a portion of the housing, a printed circuit board (PCB) disposed inside the housing, an antenna structure including a power feeding portion and a grounding portion, at least a portion of the antenna structure being electrically connected to the PCB, and a radiating element electrically connected to the power feeding portion or the grounding portion, the radiating element being positioned such that at least a portion of the radiating element overlaps the gap region when the electronic device is viewed in the first direction, the second direction, or the third direction.

In accordance with another aspect of the disclosure, an electronic device is provided. The electronic device includes a housing including a first plate facing a first direction, a second plate facing a second direction opposite to the first direction, and a side member formed facing a third direction to surround a space between the first plate and the second plate, a first gap region formed by segmenting at least a portion of the side member, a second gap region formed by spacing apart the second plate and the side member, a printed circuit board (PCB) disposed inside the housing, an antenna structure including a power feeding portion and a grounding portion, at least a portion of the antenna structure being electrically connected to the PCB, a first radiating element electrically connected to the power feeding portion or the grounding portion, the first radiating element being positioned on a side toward the first direction with respect to the PCB such that at least a portion of the first radiating element overlaps the first gap region when the electronic device is viewed in the third direction, and a second radiating element electrically connected to the power feeding portion or the grounding portion, the second radiating element being positioned on a side toward the second direction with respect to the PCB such that at least a portion of the second radiating element overlaps the second gap region when the electronic device is viewed in the second direction.

According to various embodiments, the radiating performance is improved using the radiating element disposed adjacent to the gap region.

According to various embodiments, the radiating pattern is improved by using the radiation in a front direction.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
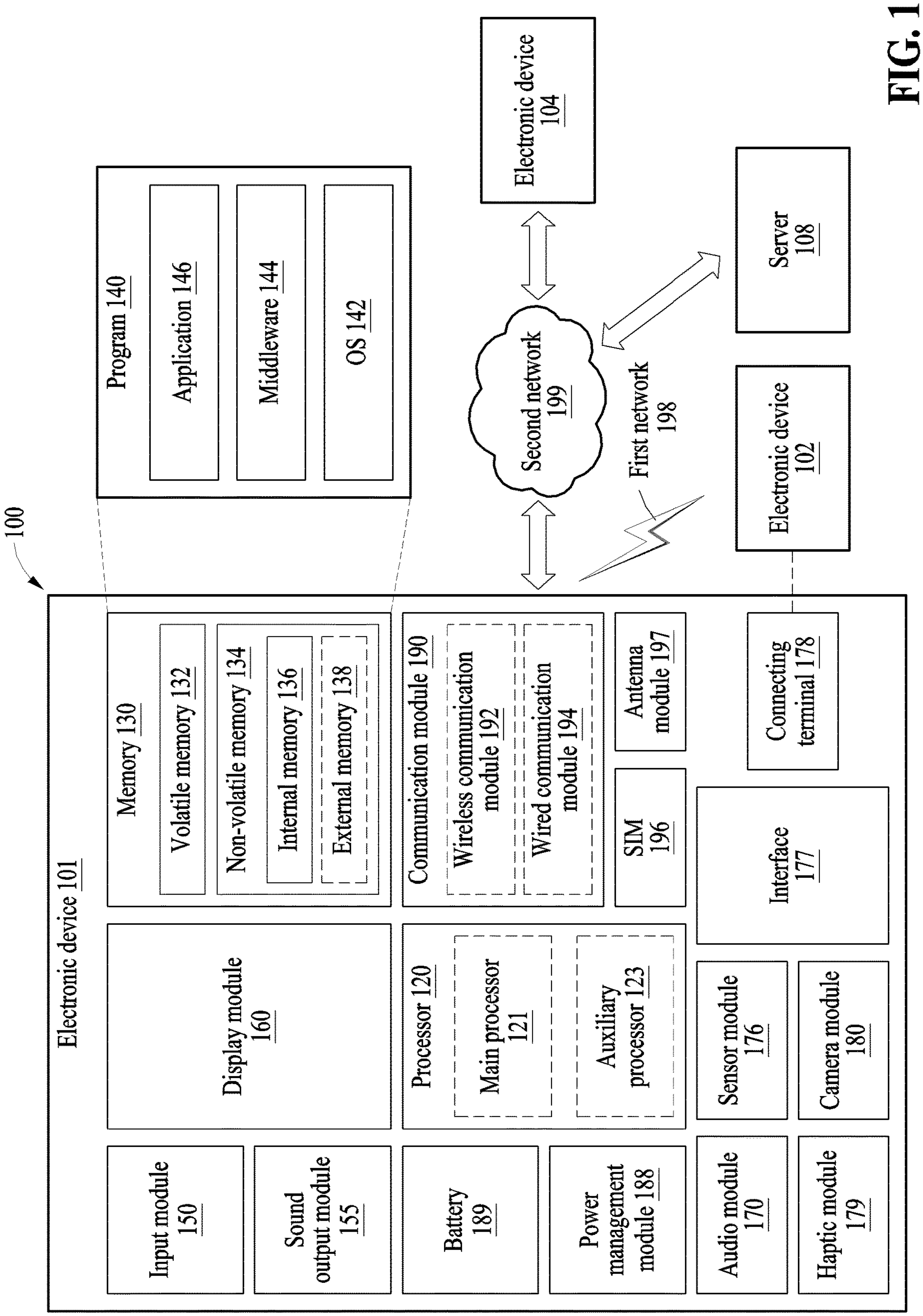
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for processing of an artificial intelligence (AI) model. The AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to detect a touch, or a pressure sensor adapted to measure the intensity of force incurred by the touch.

The audio module 170 may convert a sound into an electric signal or vice versa. According to an embodiment, the audio module 170 may obtain the sound via the input module 150, or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., an LAN or a wide area network (WAN))). These various types of communication modules may be implemented as a single component (e.g., a single chip), or may be implemented as multi components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to embodiments, the antenna module 197 may form a mm Wave antenna module. According to an example embodiment, the mm Wave antenna module may include a PCB, an RFIC disposed on a first surface (e.g., a bottom surface) of the PCB or adjacent to the first surface and capable of supporting a designated a high-frequency band (e.g., the mm Wave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more external electronic devices (e.g., the external electronic devices 102 104 and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. For this, for example, cloud computing, distributed computing, mobile edge computing (MEC), or client-server computing techniques may be used. The electronic device 101 may provide an ultra-low latency service, for example, using the distributed computing or the MEC. In another embodiment, the external electronic device 104 may include an Internet of things (IoT). The server 108 may be an intelligent server using machine learning and/or a neural network. According to an embodiment, the external electronic device 104 or the server 108 may be included in the second network 199. The electronic device 101 may be applied to an intelligent service (e.g., a smart home, a smart city, a smart car, or health care) based on 5G communication technology and IoT-related technology.

Figure 2:
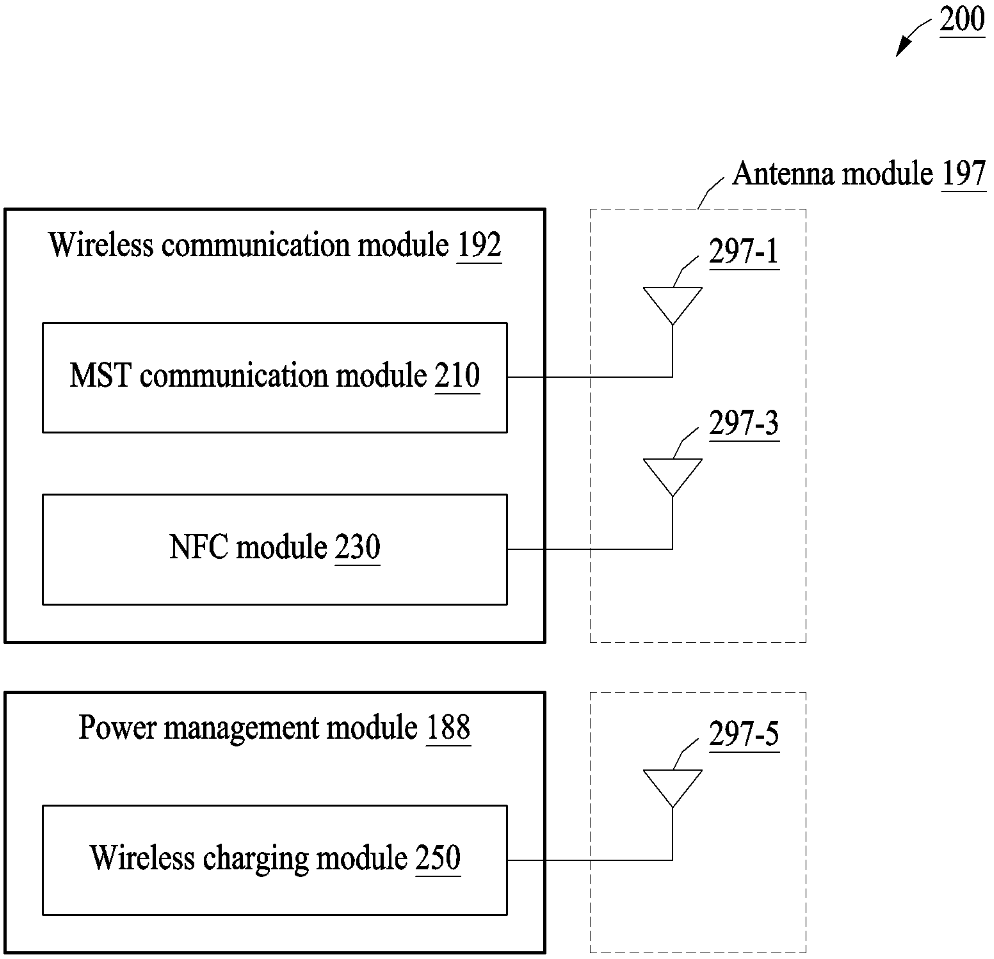
FIG. 2 is a block diagram for a wireless communication module, a power management module, and an antenna module of an electronic device according to an embodiment of the disclosure.

FIG. 2 is a block diagram for a wireless communication module, a power management module, and an antenna module of an electronic device (e.g., electronic device 101 of FIG. 1) according to an embodiment of the disclosure.

Referring to FIGS. 1 and 2, block diagram 200 illustrates that a wireless communication module 192 may include a magnetic secure transmission (MST) communication module 210 or a near-field communication (NFC) module 230, and a power management module 188 may include a wireless charging module 250. In such a case, an antenna module 197 may include a plurality of antennas that include an MST antenna 297-1 connected to the MST communication module 210, an NFC antenna 297-3 connected to the NFC module 230, and a wireless charging antenna 297-5 connected to the wireless charging module 250. For ease of description, the same components as those described with reference to FIG. 1 are briefly described or omitted from the description.

The MST communication module 210 may receive a signal including control information or payment information such as card information from the processor 120, generate a magnetic signal corresponding to the received signal, and then transfer the generated magnetic signal to the external electronic device 102 (e.g., a point-of-sale (POS) device) via the MST antenna 297-1. In order to generate the magnetic signal, according to an embodiment, the MST communication module 210 may include a switching module (not shown) that includes one or more switches connected to the MST antenna 297-1, and control the switching module to change a direction of a voltage or a current supplied to the MST antenna 297-1 according to the received signal. The change of the direction of the voltage or the current allows the direction of the magnetic signal (e.g., a magnetic field) transmitted via the MST antenna 297-1 to change accordingly. When detected at the external electronic device 102, the magnetic signal with its direction changing may cause an effect (e.g., a waveform) similar to that of a magnetic field that is generated when a magnetic card corresponding to the received signal (e.g., card information) is swiped through a card reader of the electronic device 102. According to an embodiment, for example, payment-related information and a control signal that are received by the electronic device 102 in the form of the magnetic signal may be transmitted to the external server 108 (e.g., a payment server) via the second network 199.

The NFC module 230 may obtain a signal including control information or payment information such as card information from the processor 120, and transmit the obtained signal to the external electronic device 102 via the NFC antenna 297-3. According to an embodiment, the NFC module 230 may receive such a signal transmitted from the external electronic device 102 via the NFC antenna 297-3.

The wireless charging module 250 may wirelessly transmit power to the external electronic device 102 (e.g., a cellular phone or a wearable device) via the wireless charging antenna 297-5, or wirelessly receive power from the external electronic device 102 (e.g., a wireless charging device). The wireless charging module 250 may support one or more of various wireless charging schemes including, for example, a magnetic resonance scheme or a magnetic induction scheme.

According to an embodiment, some of the MST antenna 297-1, the NFC antenna 297-3, or the wireless charging antenna 297-5 may share at least a portion of radiators. For example, the radiator of the MST antenna 297-1 may be used as the radiator of the NFC antenna 297-3 or the wireless charging antenna 297-5, or vice versa. In such a case, the antenna module 297 may include a switching circuit (not shown) adapted to selectively connect (e.g., close) or disconnect (e.g. open) at least some of antennas 297-1, 297-3, or 297-5 under the control of the wireless communication module 192 (e.g., the MST communication module 210 or the NFC module 230) or the power management module 188 (e.g., the wireless charging module 250). For example, when the electronic device 101 uses a wireless charging function, the NFC module 230 or the wireless charging module 250 may control the switching circuit to temporarily disconnect at least a portion of the radiators shared by the NFC antenna 297-3 and the wireless charging antenna 297-5 from the NFC antenna 297-3 and to connect the at least one portion thereof to the wireless charging antenna 297-5.

According to an embodiment, at least one function of the MST communication module 210, the NFC module 230, or the wireless charging module 250 may be controlled by an external processor (e.g., the processor 120). According to an embodiment, a specified function (e.g., a payment function) of the MST communication module 210 or the NFC module 230 may be performed in a trusted execution environment (TEE). According to an embodiment, the TEE may form an execution environment in which, for example, at least a partially designated area of the memory 130 is allocated to be used for performing a function (e.g., a financial transaction or personal information-related function) that requires a relatively high level of security. In such a case, access to the at least designated area may be restrictively permitted, for example, according to an entity accessing thereto or an application being executed in the TEE.

The electronic device according to various embodiments herein may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. As used herein, "A or B", "at least one of A and B", "at least one of A or B", "A, B or C", "at least one of A, B and C", and "at least one of A, B, or C," may include any one of the items listed together in the corresponding one of the phrases, or all possible combinations thereof. Terms such as "1st", "2nd", or "first" or "second" may simply be used to distinguish the component from other components in question, and do not limit the components in other aspects (e.g., importance or order). It is to be understood that if a component (e.g., a first component) is referred to, with or without the term "operatively" or "communicatively", as "coupled with," "coupled to," "connected with," or "connected to" another component (e.g., a second component), the component may be coupled with the other component directly (e.g., by wire), wirelessly, or via a third component.

As used in connection with embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply indicates that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least portion of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 3A:
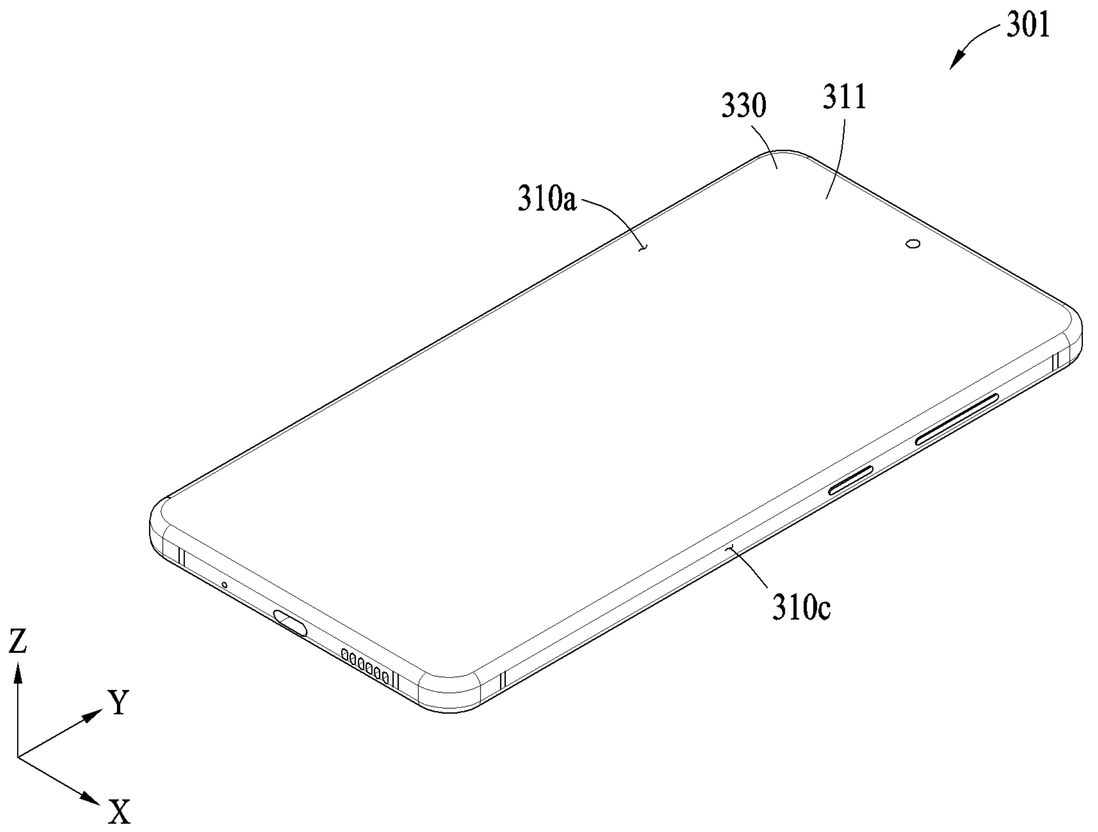
FIG. 3A is a front perspective view of an electrode according to an embodiment of the disclosure.

FIG. 3A is a front perspective view of an electrode according to an embodiment of the disclosure.

Figure 3B:
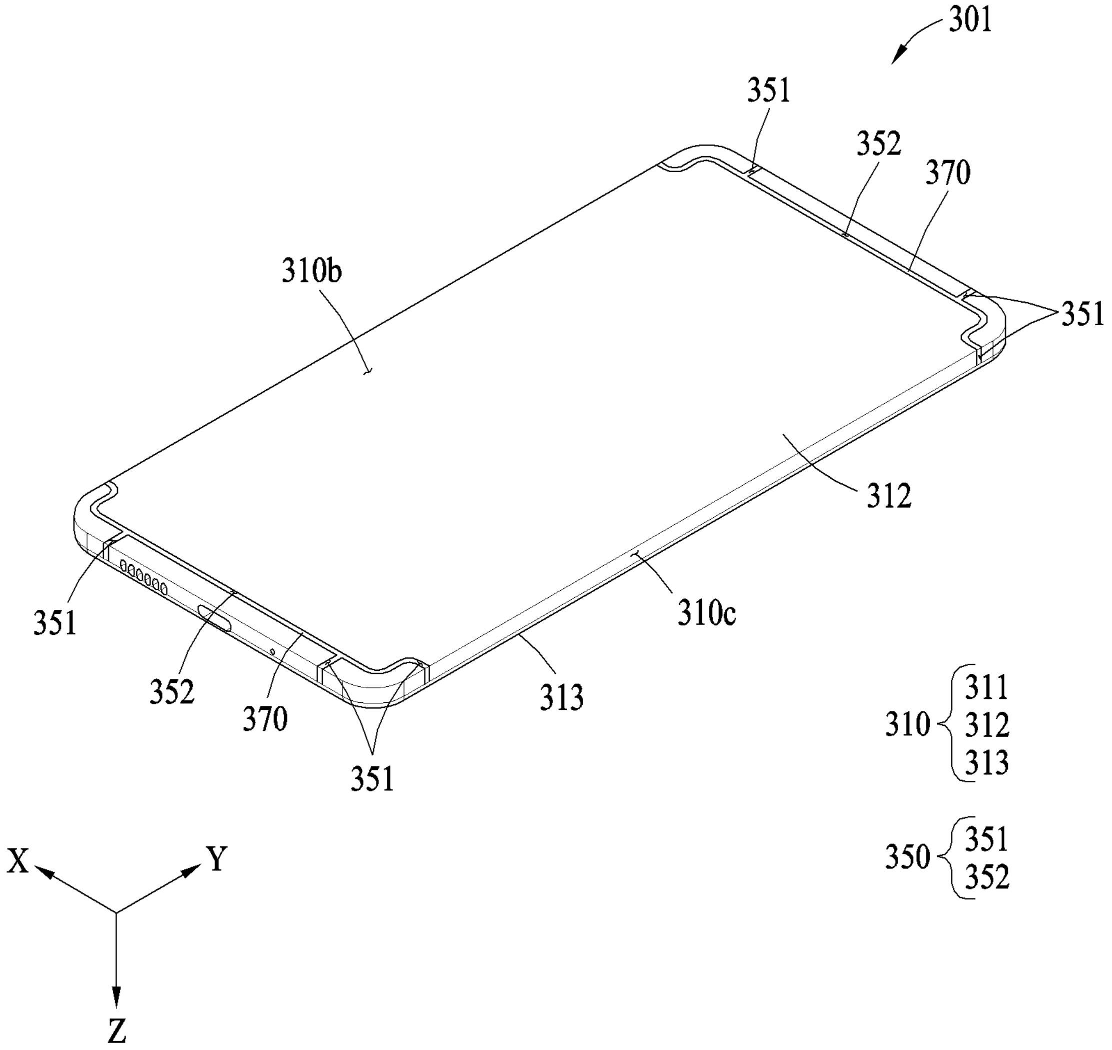
FIG. 3B is a rear perspective view of an electrode according to an embodiment of the disclosure.

FIG. 3B is a rear perspective view of an electrode according to an embodiment of the disclosure.

Referring to FIGS. 3A and 3B, an electronic device 301 (e.g., electronic device 101 of FIG. 1) according to an embodiment may include a housing 310, a display 330, a support (e.g., a support 320 of FIG. 3D), a printed circuit board (PCB) 340, an antenna structure (e.g., an antenna structure 341 of FIG. 3D), a gap region 350, a radiating element (e.g., radiating element 360 of FIG. 3D), and a molded portion 370.

In an embodiment, the housing 310 may form an appearance of the electronic device 301. The housing 310 may form a front surface 310*a* (e.g., a surface in a +z direction), a rear surface 310*b* (e.g., a surface in a −z direction), and a side surface 310*c* surrounding an internal space between the front surface 310*a* and the rear surface 310*b*. For example, the housing 310 may include a first plate 311 (e.g., a front surface plate), a second plate 312 (e.g., a rear surface plate), and a side member 313 (e.g., a side bezel structure).

In an embodiment, the front surface 310*a* may be formed by the first plate 311 at least a portion of which is substantially transparent. The first plate 311 may face, for example, a first direction (e.g., the +z direction). The first plate 311 may include, for example, a glass plate or a polymer plate including at least one coating layer.

In an embodiment, the rear surface 310*b* may be formed by the second plate 312 that is substantially opaque. The second plate 312 may face, for example, a second direction (e.g., the −z direction) opposite to the first direction (e.g., the +z direction). The second plate 312 may be formed of, for example, coated or colored glass, ceramic, polymer, metal (e.g., aluminum, stainless steel, or magnesium), or a combination thereof.

In an embodiment, the side surface 310*c* may be formed by the side member 313 coupled to the first plate 311 and the second plate 312. The side member 313 may surround at least a portion of the internal space between the front surface 310*a* and the rear surface 310*b*. The side member 313 may be formed, for example, toward a third direction (e.g., an x direction and/or a y direction) to surround a space between the first plate 311 and the second plate 312. The side member 313 may include a metal and/or a polymer. At least a portion of the side member 313 may be formed of, for example, a metal. At least a portion of the side member 313 may be electrically connected to a power feeding portion (e.g., a power feeding portion 3411 of FIG. 3D) (e.g., the wireless communication module 192 of FIG. 1) to function as a radiating element that radiates a signal.

In an embodiment, the second plate 312 and the side member 313 may be integrally and seamlessly formed. In an embodiment, the second plate 312 and the side member 313 may be formed of substantially the same material (e.g., aluminum).

In an embodiment, the display 330 (e.g., the display module 160 of FIG. 1) may be disposed on the front surface 310*a* of the electronic device 301. In an embodiment, the display 330 may be exposed through at least a portion of the first plate 311. The display 330 may be supported by the support 320. For example, the support 320 may support the display 330 from the rear surface (e.g., a surface in the −z direction). In an embodiment, the support 320 may be formed of a metal or molding. For example, the support 320 may be formed integrally with a molded portion 370 to be described below.

In an embodiment, the PCB 340 may be disposed in the internal space of the housing 310. At least a portion of an antenna structure (e.g., the antenna structure 341 of FIG. 3D) may be electrically connected to or disposed on the PCB 340.

In an embodiment, the gap region 350 may be a region formed as at least a portion of the housing 310 is spaced apart or segmented. The gap region 350 may be formed to have a narrow width. For example, the gap region 350 may be a slit or may be formed in a form of a slit. The radiation of antenna signals may be performed in the gap region 350. For example, the gap region 350 may be filled with the molded portion 370. For example, the molded portion 370 may be formed through molding to include a shape substantially corresponding to the gap region 350. The molded portion 370 may be substantially formed of a material having an insulating property. Since the gap region 350 is filled with the molded portion 370, internal components of the electronic device 301 may not be exposed to the outside. The molded portion 370 may be integrally formed with the support 320. The molded portion 370 may be, for example, at least a portion of the support 320.

In an example, the gap region 350 may include a first gap region 351 and a second gap region 352.

In an example, the first gap region 351 may be a region formed as at least a portion of the side member 313 is segmented. The first gap region 351 may be, for example, a region formed by cutting a portion of the side member 313. The first gap region 351 may be a slit or formed in the form of a slit having a longitudinal direction in a thickness direction (e.g., the z direction) of the electronic device 301. The number of first gap region 351 may be one or more. The first gap region 351 may be formed on a side surface of the electronic device 301. The first gap region 351 may be formed, for example, on a side surface of the electronic device 301 in a width direction (e.g., the x direction) and/or a side surface thereof in the longitudinal direction (e.g., the y direction). The plurality of first gap regions 351 may be formed, for example, to be spaced apart from each other along a circumference of the side surface of the electronic device 301. Meanwhile, a position, a number, and/or a shape of the first gap regions 351 shown in FIGS. 3A and 3B are examples, and embodiments are not limited thereto.

In an embodiment, the second gap region 352 may be formed on the second plate 312 or between the second plate 312 and the side member 313. For example, the second gap region 352 may be a region in which the second plate 312 and the side member 313 are spaced apart from each other. In another example, the second gap region 352 may be substantially formed on the rear surface 310*b* of the electronic device 301. The second gap region 352, for example, may be a slit or formed in the form of a slit substantially having a longitudinal direction in the width direction (e.g., the x direction) of the electronic device 301. The number of second gap regions 352 may be one or more. The second gap region 352 may be formed, for example, on an upper end portion (e.g., an end portion in a +y direction) and/or a lower end portion (e.g., an end portion in a −y direction) of the rear surface 310*b* of the electronic device 301. For example, the second gap region 352 may have at least a portion that is formed in a bent shape. The first gap region 351 and the second gap region 352 may communicate with each other. For example, the first gap region 351 formed on the side surface of the electronic device 301 in the width direction (e.g., the x direction) may communicate with an end portion of the second gap region 352. For example, the first gap region 351 formed on the side surface of the electronic device 301 in the longitudinal direction (e.g., the y direction) may communicate in a direction (e.g., the y direction) orthogonal to the longitudinal direction (e.g., the x direction) of the second gap region 352. At least a portion of the first gap region 351 may be formed by cutting a portion of the second plate 312. Meanwhile, a position, a number, and/or a shape of the second gap regions 352 shown in FIGS. 3A and 3B are examples, and embodiments are not limited thereto.

Figure 3C:
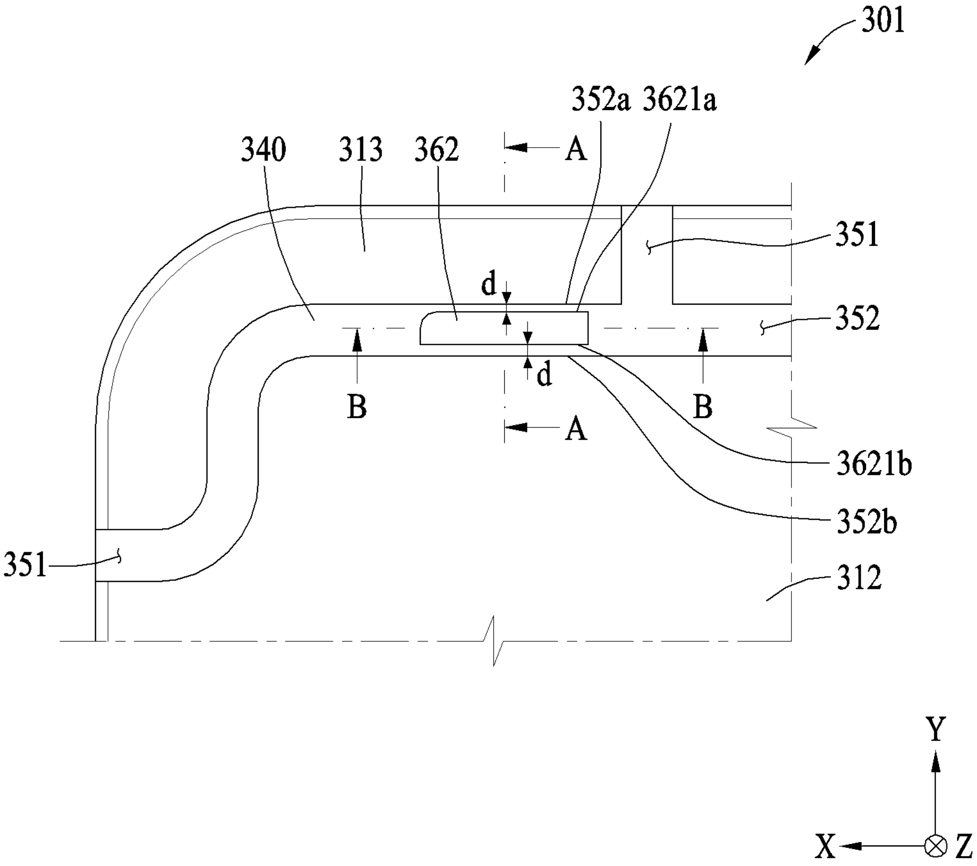
FIG. 3C is a rear view of an electronic device omitting a molded portion to illustrate internal components according to an embodiment of the disclosure.

FIG. 3C is a rear view of an electronic device omitting a molded portion to illustrate internal components according to an embodiment of the disclosure.

Figure 3D:
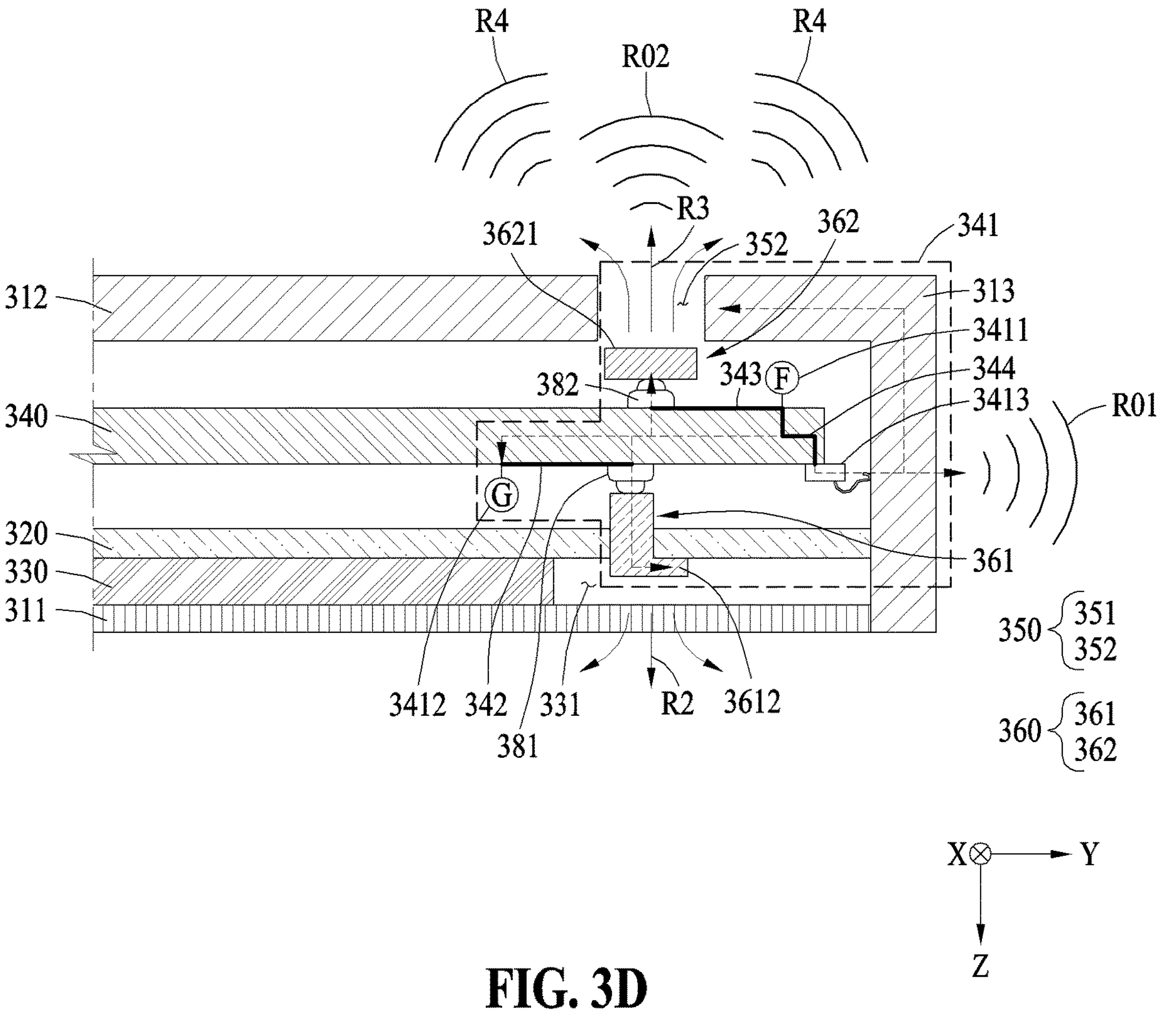
FIG. 3D is a schematic cross-sectional view taken along line A-A of FIG. 3C according to an embodiment of the disclosure.

FIG. 3D is a schematic cross-sectional view taken along line A-A of FIG. 3C according to an embodiment of the disclosure.

Figure 3E:
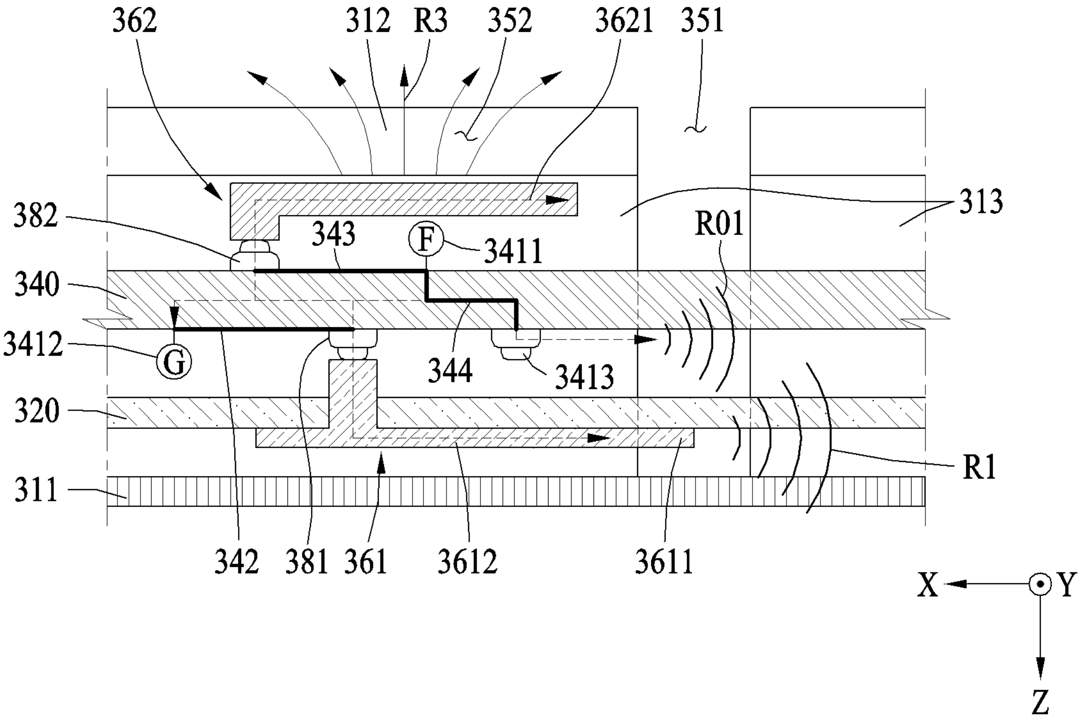
FIG. 3E is a schematic cross-sectional view taken along line B-B of FIG. 3C according to an embodiment of the disclosure.

FIG. 3E is a schematic cross-sectional view taken along line B-B of FIG. 3C according to an embodiment of the disclosure.

Referring to FIGS. 3C to 3E, in an embodiment, an antenna structure 341 may be a component to transmit and/or receive antenna signals. At least a portion of the antenna structure 341 may be electrically connected to the PCB 340. The antenna structure 341 may include the power feeding portion 3411, a grounding portion 3412, and a radiating element (e.g., at least a portion of the side member 313, a first radiating element 361 and/or a second radiating element 362). The power feeding portion 3411 (e.g., the wireless communication module 192 of FIG. 1) may generate a current and/or a voltage to generate an antenna signal. The number of power feeding portion 3411 may be one or more. The grounding portion 3412 may substantially refer to a ground layer of the PCB 340 or refer to a component electrically connected to the ground layer of the PCB 340. The number of grounding portions 3412 may be one or more.

In an embodiment, the power feeding portion 3411 may be electrically connected to the side member 313 via a connecting member 3413 (e.g., a C-clip). The power feeding portion 3411 may be, for example, electrically connected to the connecting member 3413 via a conductive path 344 formed on the PCB 340 and/or an LC element. The antenna structure 341 may use at least a portion of the side member 313 as a radiating element. For example, as shown in FIGS. 3D and 3E, the antenna structure 341 may use at least a portion of the side member 313 as a radiating element to perform radiation R01 through the first gap region 351 and/or radiation R02 through the second gap region 352. However, radiation marks R01 and R02 shown in FIGS. 3D and 3E are provided to help understanding, and do not limit radiating patterns.

Hereinafter, the radiating element 360 according to an embodiment will be described with reference to FIGS. 3C to 3E.

In an embodiment, at least a portion of the radiating element 360 may be electrically connected to the power feeding portion 3411 (e.g., the wireless communication module 192 of FIG. 1) and/or the grounding portion 3412. For example, at least a portion of the radiating element 360 may be electrically connected to the power feeding portion 3411 via connecting members 381 and 382 (e.g., C-clips), conductive paths 342 and 343 formed on the PCB 340, and/or an LC element. At least a portion of the radiating element 360 may be positioned adjacent to the gap region 350. For example, when an electronic device (e.g., the electronic device 301 of FIG. 3A) is viewed in the first direction (e.g., the +z direction), the second direction (e.g., the −z direction), and/or the third direction (e.g., the x and/or y direction), at least a portion of the radiating element 360 may be positioned to overlap the gap region 350. The radiating element 360 may perform a function of radiating a signal received from the power feeding portion 3411 in the gap region 350. At least a portion of the radiating element 360 may be formed of a metal.

In an embodiment, the radiating element 360 may include the first radiating element 361 and the second radiating element 362.

In an embodiment, the first radiating element 361 may be electrically connected to the power feeding portion 3411 of the antenna structure 341 (e.g., the wireless communication module 192 of FIG. 1) and/or the grounding portion 3412. For example, as shown in FIGS. 3D and 3E, the first radiating element 361 may be electrically connected to the grounding portion 3412. In an embodiment, at least a portion of the first radiating element 361 may be electrically connected to the grounding portion 3412 via a first connecting member 381, a first conductive path 342 formed on the PCB 340, and/or an LC element. However, this is merely an example, and the first radiating element 361 may be variously connected to the power feeding portion 3411 and/or the grounding portion 3412. Meanwhile, the power feeding portion 3411 and/or the grounding portion 3412 shown in FIGS. 3D and 3E are provided to help understanding, and the positions of the power feeding portion 3411 and the grounding portion 3412 are not limited thereto.

In an embodiment, at least a portion of the first radiating element 361 may be positioned adjacent to the first gap region 351. The first radiating element 361 may be, for example, positioned on a side toward the first direction (e.g., the +z direction) with respect to the PCB 340. When the electronic device 301 is viewed in the third direction (e.g., the x and/or y direction), at least a portion of the first radiating element 361 may overlap the first gap region 351. For example, when the electronic device 301 is viewed in the third direction (e.g., the x and/or y direction), an end portion 3611 of the first radiating element 361 may overlap the first gap region 351 at an adjacent position.

In an embodiment, when the electronic device 301 is viewed in the first direction (e.g., the +z direction), at least a portion (e.g., a first portion 3612) of the first radiating element 361 may overlap a bezel region 331 of the display 330. The bezel region 331 may refer to, for example, a black mask (BM) region formed on an outer edge of the display 330. The first portion 3612 of the first radiating element 361 may be formed in a longitudinal direction parallel to the longitudinal direction of the side surface of the electronic device 301. For example, based on FIG. 3E, the first portion 3612 of the first radiating element 361 may have the longitudinal direction in the x direction. The first portion 3612 may be positioned in a front direction (e.g., the +z direction) with respect to the support 320 that supports the display 330. For example, the first radiating element 361 may have a shape that at least a portion thereof penetrates the support 320. The end portion 3611 of the first radiating element 361 may be substantially an end portion of the first portion 3612.

Figure 4A:
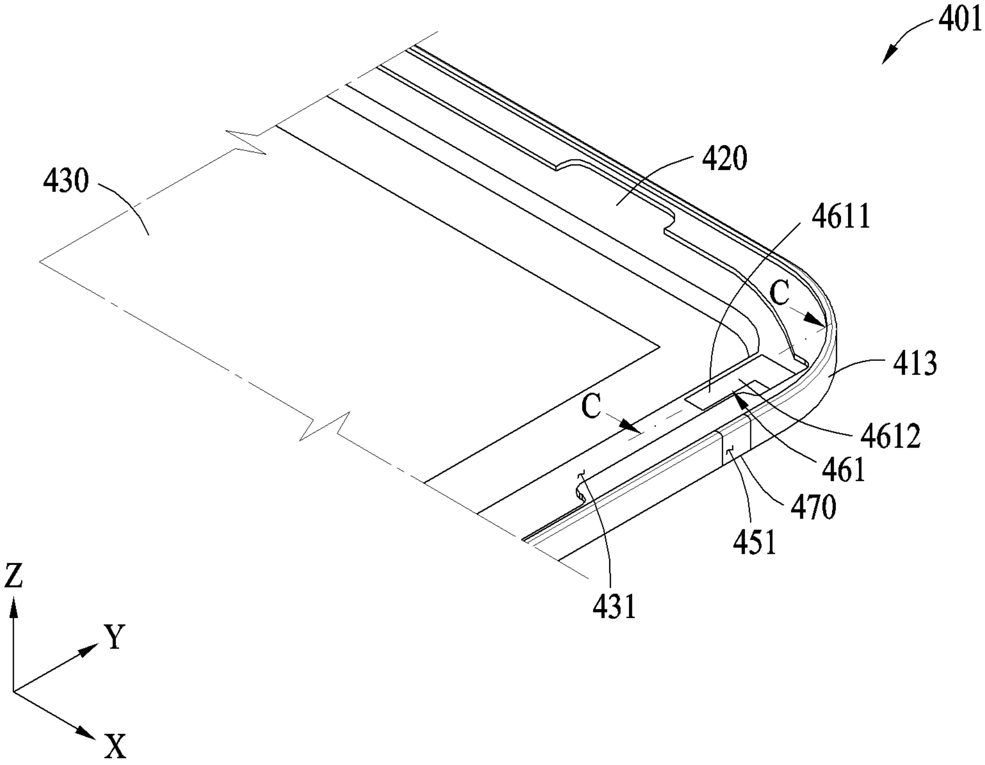
FIG. 4A is a perspective view of an electronic device omitting a first plate to illustrate internal components according to an embodiment of the disclosure.
Figure 4B:
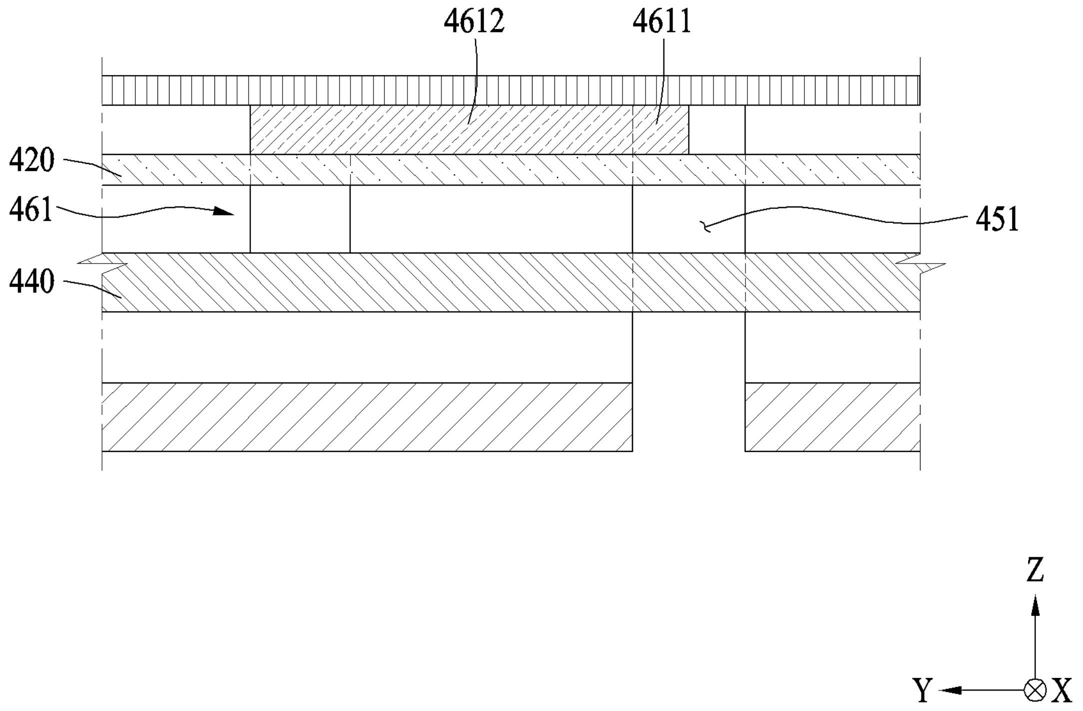
FIG. 4B is a schematic cross-sectional diagram taken along line C-C of FIG. 4A according to an embodiment of the disclosure.

In an embodiment, the first radiating element 361 may perform radiation R1 through the first gap region 351 and radiation R2 through the bezel region 331 of the display 330. For example, when the first radiating element 361 is connected to the grounding portion 3412, a current flowing from the power feeding portion 3411 may be transferred to the end portion 3611 and the first portion 3612 of the first radiating element 361. Since the first portion 3612 is disposed adjacent to the bezel region 331, the current transferred to the first portion 3612 may radiate (e.g., radiation R2) a signal in the front direction (e.g., the +z direction) through the bezel region 331. Since the bezel region 331 is substantially formed to have a narrow width, radiating performance may be improved in a high-frequency band (e.g., a band of 3 gigahertz (GHz) or higher). In addition, since the end portion 3611 of the first radiating element 361 is disposed adjacent to the first gap region 351, a signal may be radiated (e.g., radiation R1) to the outside through the first gap region 351 in the end portion 3611 of the first radiating element 361. For example, the signal may be radiated (e.g., radiation R1) in a side direction (e.g., the +y direction) through the first gap region 351 in the end portion 3611 of the first radiating element 361. Meanwhile, in FIGS. 3A to 3E, it is illustrated that the first radiating element 361 is disposed adjacent to the first gap region 351 formed on the upper end (e.g., the +y direction) of the electronic device 301, however, this is merely an example, and the position of the first gap region 351 to which the first radiating element 361 is positioned adjacent is not limited thereto. For example, as shown in FIGS. 4A and 4B to be described below, a first radiating element 461 may be disposed adjacent to a first gap region 451 formed on a side surface of an electronic device 401 in the width direction (e.g., the x direction).

Meanwhile, the shape of the first radiating element 361 shown in FIGS. 3D and 3E is an example, and the shape of the first radiating element 361 is not limited thereto. The first radiating element 361 may be formed to extend and/or bent to a path capable of avoiding interference with other components such that the end portion 3611 is disposed adjacent to the first gap region 351 and/or the first portion 3612 is disposed adjacent to the bezel region 331. In addition, radiation marks R1 and R2 shown in FIGS. 3D and 3E are provided to help understanding, and do not limit radiating patterns.

In an embodiment, the second radiating element 362 may be electrically connected to the power feeding portion 3411 (e.g., the wireless communication module 192 of FIG. 1) and/or the grounding portion 3412 of the antenna structure 341. For example, as shown in FIGS. 3D and 3E, the second radiating element 362 may be electrically connected to the power feeding portion 3411. In an embodiment, at least a portion of the second radiating element 362 may be electrically connected to the power feeding portion 3411 via a second connecting member 382, a second conductive path 343 formed on the PCB 340, and/or an LC element. However, this is merely an example, and the second radiating element 362 may be variously connected to the power feeding portion 3411 and/or the grounding portion 3412. Meanwhile, the power feeding portion 3411 and the grounding portion 3412 shown in FIGS. 3D and 3E are provided to help understanding, and the positions of the power feeding portion 3411 and the grounding portion 3412 are not limited thereto.

In an embodiment, at least a portion of the second radiating element 362 may be disposed adjacent to the second gap region 352. The second radiating element 362 may be, for example, positioned on a side toward the second direction (e.g., the −z direction) with respect to the PCB 340. When the electronic device 301 is viewed in the second direction (e.g., the −z direction), at least a portion of the second radiating element 362 may overlap the second gap region 352. For example, when the electronic device 301 is viewed in the second direction (e.g., the −z direction), a second portion 3621 of the second radiating element 362 may overlap the second gap region 352 at an adjacent position.

In an embodiment, the second portion 3621 of the second radiating element 362 may be positioned parallel to the second gap region 352. For example, the second portion 3621 may be substantially parallel to an x-y plane. The second portion 3621 may extend along a longitudinal direction (e.g., the x direction) of the second gap region 352. The second portion 3621, for example, may be formed to substantially have a longitudinal direction in the x direction. A width (e.g., a width in the y direction) of the second portion 3621 may be smaller than a width (e.g., a width in the y direction) of the second gap region 352. According to the configuration described above, when the electronic device 301 is viewed in the second direction (e.g., the −z direction), both ends 3621*a* and 3621*b* of the second portion 3621 in the width direction (e.g., both ends in the y direction), and both ends 352*a* and 352*b* of the second gap region 352 in the width direction (e.g., both ends in the y direction) may be disposed to be spaced apart from each other. For example, a space d between both ends 3621*a* and 3621*b* of the second portion 3621 in the width direction and both ends 352*a* and 352*b* of the second gap region 352 in the width direction may be smaller than about 0.5 millimeters (mm). The second portion 3621 may be supported by a molded portion (e.g., the molded portion 370 of FIG. 3B) filling the second gap region 352. For example, a surface of the second portion 3621 in the second direction (e.g., the −z direction) may be bonded to the molded portion 370 through a double-sided adhesive tape. However, this is an example, and a position, a number and/or a shape of the second portion 3621 are not limited thereto.

In an embodiment, the second radiating element 362 may perform radiation R3 through the second gap region 352 and radiation R4 through coupling with the second plate 312. For example, when the second radiating element 362 is connected to the power feeding portion 3411, the current flowing from the power feeding portion 3411 may be transferred to the second portion 3621 of the second radiating element 362. Since the second portion 3621 is disposed adjacent to the second gap region 352, a signal may be radiated (e.g., radiation R3) a signal to the outside through the second gap region 352 in the second portion 3621. For example, the signal may be radiated (e.g., radiation R3) in a rear direction (e.g., the −z direction) through the second gap region 352 in the second portion 3621. Since both ends 3621*a* and 3621*b* of the second portion 3621 in the width direction and both ends 352*a* and 352*b* of the second gap region 352 in the width direction are spaced apart from each other, electromagnetic coupling may occur between the second portion 3621 and the second plate 312. The current transferred to the second portion 3621 may radiate (e.g., radiation R4) a signal through coupling with the second plate 312. For example, since a capacitance generated by coupling is in inverse proportion to the space d between both ends 3621*a* and 3621*b* of the second portion 3621 in the width direction and both ends 352*a* and 352*b* of the second gap region 352 in the width direction, the radiating performance may be improved when the space d is smaller than 0.5 mm.

Meanwhile, the shape of the second radiating element 362 shown in FIGS. 3C to 3E is an example, and the shape of the second radiating element 362 is not limited thereto. The second radiating element 362 may be formed to extend and/or bent to a path capable of avoiding interference with other components such that the second portion 3621 is disposed adjacent to the second gap region 352. In addition, radiation marks R3 and R4 shown in FIGS. 3D and 3E are provided to help understanding, and do not limit radiating patterns.

According to the configuration described above, in addition to the radiation R01 through the first gap region 351 of the side member 313 and the radiation R02 through the second gap region 352 of the second plate 312 of the related art, the radiation R1 of the first radiating element 361 through the first gap region 351, the radiation R2 of the first radiating element 361 through the bezel region 331 of the display 330, the radiation R3 of the second radiating element 362 through the second gap region 352, and/or the radiation R4 through the coupling of the second radiating element 362 and the second plate 312 may further occur, and thus, high-efficiency broadband antenna may be implemented. A signal may be radiated (e.g., radiation R1) in the side direction (e.g., the y direction and/or the x direction) through the first gap region 351 using the first radiating element 361, a signal may be radiated (e.g., radiation R2) in the front direction (e.g., the +z direction) through the bezel region 331 of the display 330 using the first radiating element 361, a signal may be radiated (e.g., radiation R3) in the rear direction (e.g., the −z direction) through the second gap region 352 using the second radiating element 362, and a signal may be radiated (e.g., radiation R4) in the rear direction (e.g., the −z direction) through the coupling of the second radiating element 362 and the second plate 312. Accordingly, directivity of radiation may be compensated to improve radiating patterns.

Figure 3F:
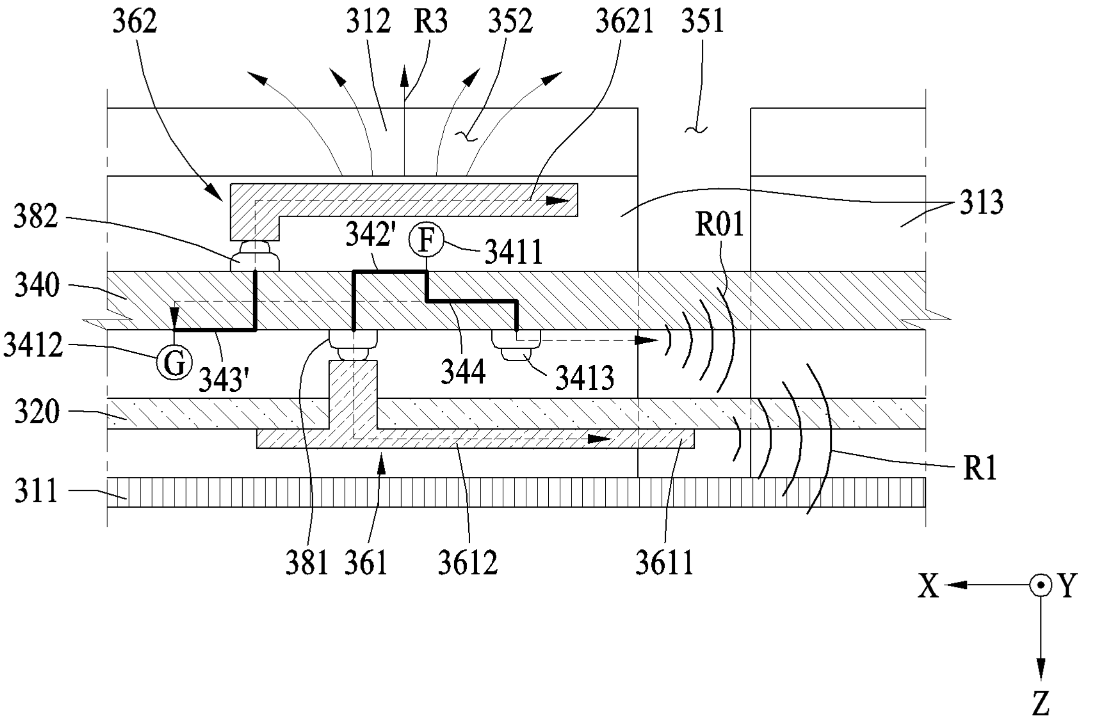
FIGS. 3F, 3G, and 3H are schematic cross-sectional views of an electronic device according to various embodiments of the disclosure.
Figure 3G:
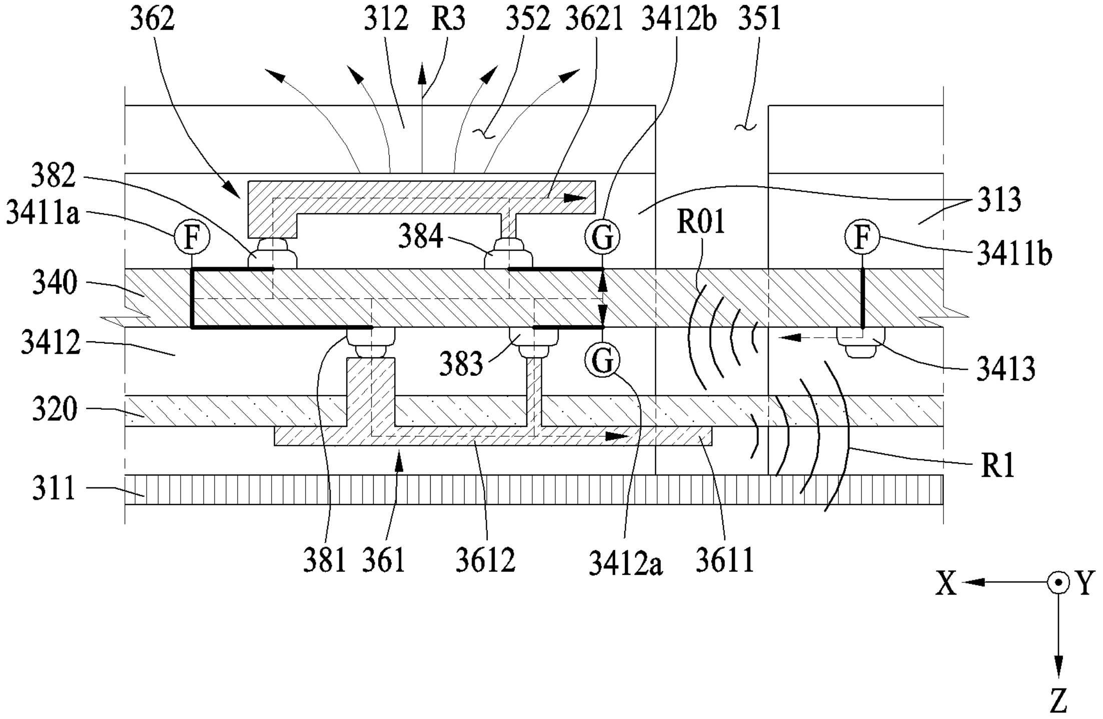
Figure 3H:
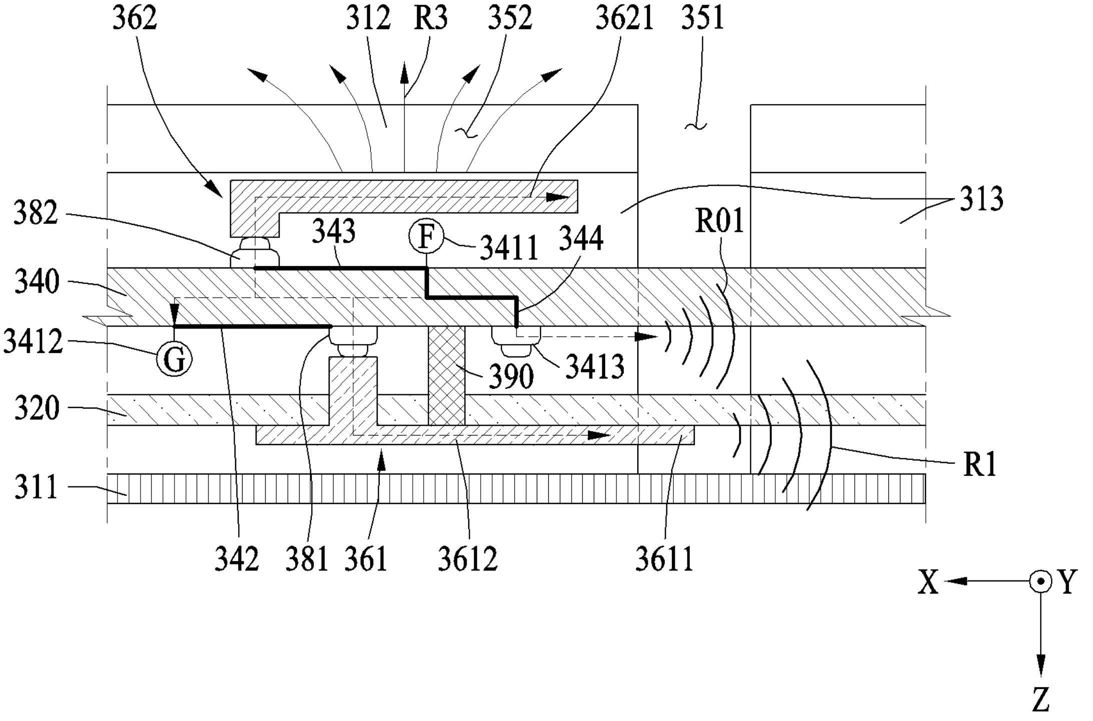

FIGS. 3F, 3G, and 3H are schematic cross-sectional views of an electronic device according to various embodiments of the disclosure.

Referring to FIG. 3F, in an embodiment, a first radiating element 361 may be electrically connected to a power feeding portion 3411 via a first connecting member 381, a first conductive path 342' formed on the PCB 340, and/or an LC element, and a second radiating element 362 may be electrically connected to a grounding portion 3412 via a second connecting member 382, a second conductive path 343' formed on the PCB 340, and/or an LC element. Even due to a connection relationship as shown in FIG. 3F, a signal may be radiated in substantially the same or similar manner as described above with reference to FIGS. 3A to 3E.

Referring to FIG. 3G, in an embodiment, a first radiating element 361 and a second radiating element 362 may be connected to a common first power feeding portion 3411*a*. The first power feeding portion 3411*a* commonly connected to the first radiating element 361 and the second radiating element 362 may be a separate power feeding portion that is different from a second power feeding portion 3411*b* (e.g., the power feeding portion 3411 of FIG. 3D) connected to a side member (e.g., the side member 313 of FIG. 3A). Due to a connection relationship as shown in FIG. 3G, a separate signal different from a radiation signal (e.g., a radiation signal according to radiation R01 and/or R02 of FIG. 3D) by the second power feeding portion 3411*b* may be generated through the first radiating element 361 and the second radiating element 362 connected to the separate first power feeding portion 3411*a*, and thus, a broadband antenna may be implemented.

Referring to FIG. 3G, in an embodiment, a first radiating element 361 may be electrically connected to a first grounding portion 3412*a* via a third connecting member 383 (e.g., a C-clip). The second radiating element 362 may be electrically connected to a second grounding portion 3412*b* via a fourth connecting member 384 (e.g., a C-clip). Meanwhile, the first grounding portion 3412*a* and the second grounding portion 3412*b* may be electrically connected to each other or may have substantially the same configuration. However, this is an example, and various connection relationships may be implemented according to the structure and/or type of the antenna.

Referring to FIG. 3H, in an embodiment, a first radiating element 361 may be electrically connected to a metal component 390 disposed adjacent to the first radiating element 361 inside a housing (e.g., the housing 310 of FIG. 3B). The metal component 390 may refer to any component including a metal. The metal component 390 may include, for example, a camera, a microphone, a speaker, and/or a connector. However, this is an example, and the metal component 390 is not limited thereto. Due to a connection relationship as shown in FIG. 3H, when a signal is radiated through the first radiating element 361, the generation of a noise may be reduced in a signal due to the metal component 390 disposed adjacent thereto. Meanwhile, an embodiment according to FIG. 3H is an example, and even in a case of the second radiating element 362, a metal component disposed adjacent to the second radiating element 362 may be electrically connected to the inside of the housing 310.

FIG. 4A is a perspective view of an electronic device omitting a first plate to illustrate internal components according to an embodiment of the disclosure.

FIG. 4B is a schematic cross-sectional diagram taken along line C-C of FIG. 4A according to an embodiment of the disclosure.

Referring to FIGS. 4A and 4B, an electronic device 401 (e.g., electronic device 101 of FIG. 1) according to an embodiment may include a housing 410 (e.g., the housing 310 of FIG. 3B), a display 430 (e.g., the display 330 of FIG. 3A), a support 420 (e.g., the support 320 of FIG. 3D), a PCB 440 (e.g., the PCB 340 of FIG. 3D), the first gap region 451 (e.g., the first gap region 351 of FIG. 3B), the first radiating element 461 (e.g., the first radiating element 361 of FIG. 3D), and/or a molded portion 470 (e.g., the molded portion 370 of FIG. 3B). The description of an embodiment with reference to FIGS. 4A and 4B is based on the description provided above with reference to FIGS. 3A to 3E, unless otherwise noted.

In an embodiment, at least a portion of the first radiating element 461 may be disposed adjacent to the first gap region 451. The first radiating element 461 may be, for example, positioned on a side toward the first direction (e.g., the +z direction) with respect to the PCB 440. When the electronic device 401 is viewed in the third direction (e.g., the +x direction), at least a portion of the first radiating element 461 may overlap the first gap region 451. For example, when the electronic device 401 is viewed in the third direction (e.g., the +x direction), an end portion 4611 of the first radiating element 461 may overlap the first gap region 451 at an adjacent position. The first gap region 451 positioned adjacent to the first radiating element 461 may be a gap region formed on a side surface of the electronic device 401. For example, the first gap region 451 may be a gap region formed on the side surface of the electronic device 401 in the width direction (e.g., the x direction).

In an embodiment, when the electronic device 401 is viewed in the first direction (e.g., the +z direction), at least a portion (e.g., a first portion 4612) of the first radiating element 461 may overlap a bezel region 431 of the display 430 at an adjacent position. The bezel region 431 may refer to, for example, a BM region formed on an outer edge of the display 430. The first portion 4612 of the first radiating element 461 may be formed in a longitudinal direction parallel to the longitudinal direction of the side surface of the electronic device 401. For example, based on FIG. 4A, the first portion 4612 of the first radiating element 461 may have the longitudinal direction in the y direction. The first portion 4612 may be positioned in a front direction (e.g., the +z direction) with respect to the support 420 that supports the display 430. For example, the first radiating element 461 may have a shape that at least a portion thereof penetrates the support 420. The end portion 4611 of the first radiating element 461 described above may be substantially an end portion of the first portion 4612.

In an embodiment, the first radiating element 461 may perform radiation through the first gap region 451 and radiation through the bezel region 431 of the display 430. The specific description thereof is based on the description provided above with reference to FIGS. 3C to 3E.

Meanwhile, the shape of the first radiating element 461 shown in FIGS. 4A and 4B is an example, and the shape of the first radiating element 461 is not limited thereto. The first radiating element 461 may be formed to extend and/or bent to a path capable of avoiding interference with other components such that the end portion 4611 is disposed adjacent to the first gap region 451 and/or the first portion 4612 is disposed adjacent to the bezel region 431. FIGS. 4A and 4B do not show a second radiating element (e.g., the second radiating element 362 of FIG. 3D) and a second gap region (e.g., the second gap region 352 of FIG. 3D), however, it will be apparent to those skilled in the art that the second radiating element 362 and the second gap region 352 are applicable to an embodiment according to FIGS. 4A and 4B in substantially the same or similar manner as described above with reference to FIGS. 3A to 3E.

In an embodiment, an electronic device may include a housing including a first plate facing a first direction, a second plate facing a second direction opposite to the first direction, and a side member formed facing a third direction to surround a space between the first plate and the second plate, a gap region formed by spacing apart or segmenting at least a portion of the housing, a printed circuit board (PCB) disposed inside the housing, an antenna structure including a power feeding portion and a grounding portion, at least a portion of the antenna structure being electrically connected to the PCB, and a radiating element electrically connected to the power feeding portion or the grounding portion, the radiating element being positioned such that at least a portion of the radiating element overlaps the gap region when the electronic device is viewed in the first direction, the second direction, or the third direction.

In an embodiment, the gap region includes a first gap region which is formed as at least a portion of the side member is segmented, and the radiating element includes a first radiating element positioned on a side toward the first direction with respect to the PCB 340.

In an embodiment, when the electronic device is viewed in the third direction, an end portion of the first radiating element may overlap the first gap region.

In an embodiment, the electronic device further includes a display disposed inside the housing and at least a portion of the display is exposed through the first plate, and when the electronic device is viewed in the first direction, at least a first portion of the first radiating element overlaps a bezel region of the display.

In an embodiment, the first radiating element performs radiation through the first gap region and radiation through the bezel region of the display.

In an embodiment, the gap region includes a second gap region formed as the second plate and the side member are spaced apart from each other, and the radiating element includes a second radiating element positioned on a side toward the second direction with respect to the PCB.

In an embodiment, when the electronic device is viewed in the second direction, at least a second portion of the second radiating element overlaps the second gap region.

In an embodiment, the second portion is positioned parallel to the second gap region.

In an embodiment, the second portion extends along a longitudinal direction of the second gap region.

In an embodiment, a width of the second portion is smaller than a width of the second gap region.

In an embodiment, the second gap region is filled with a molded portion, and the second portion is bonded to and supported by the molded portion.

In an embodiment, the second radiating element performs radiation through the second gap region and radiation through coupling with the second plate.

In an embodiment, the power feeding portion includes a first power feeding portion electrically connected to the radiating element, and a second power feeding portion electrically connected to the side member.

In an embodiment, the radiating element is electrically connected to the power feeding portion or the grounding portion through a connecting member.

In an embodiment, the radiating element is electrically connected to a metal component disposed inside the housing.

In an embodiment, an electronic device includes a housing including a first plate facing a first direction, a second plate facing a second direction opposite to the first direction, and a side member formed facing a third direction to surround a space between the first plate and the second plate, a first gap region which is formed as at least a portion of the side member is segmented, a second gap region formed as the second plate and the side member are spaced apart from each other, a printed circuit board (PCB) disposed inside the housing, an antenna structure including a power feeding portion and a grounding portion, at least a portion of the antenna structure being electrically connected to the PCB, a first radiating element electrically connected to the power feeding portion or the grounding portion, the first radiating element being positioned on a side toward the first direction with respect to the PCB such that at least a portion of the first radiating element overlaps the first gap region when the electronic device is viewed in the third direction, and a second radiating element electrically connected to the power feeding portion or the grounding portion, the second radiating element being positioned on a side toward the second direction with respect to the PCB such that at least a portion of the second radiating element overlaps the second gap region when the electronic device is viewed in the second direction.

In an embodiment, when the electronic device is viewed in the third direction, an end portion of the first radiating element may overlap the first gap region, and when the electronic device is viewed in the second direction, an end portion of the second radiating element overlaps the second gap region.

In an embodiment, the electronic device further includes a display disposed inside the housing and at least a portion of the display is exposed through the first plate, and when the electronic device is viewed in the first direction, at least a first portion of the first radiating element may overlap a bezel region of the display.

In an embodiment, the first radiating element performs radiation through the first gap region and radiation through the bezel region of the display, and the second radiating element performs radiation through the second gap region and radiation through coupling with the second plate.

In an embodiment, the first radiating element is connected to the power feeding portion and the second radiating element is connected to the grounding portion, or the first radiating element is connected to the grounding portion and the second radiating element is connected to the power feeding portion.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a housing including a first plate facing a first direction, a second plate facing a second direction opposite to the first direction, and a side member formed facing a third direction to surround a space between the first plate and the second plate;

a gap region formed by spacing apart or segmenting at least a portion of the housing;

a printed circuit board (PCB) disposed inside the housing;

an antenna structure including a power feeding portion and a grounding portion, at least a portion of the antenna structure being electrically connected to the PCB; and a radiating element electrically connected to the power feeding portion or the grounding portion, the radiating element being positioned such that at least a portion of the radiating element overlaps the gap region when the electronic device is viewed in the first direction, the second direction, or the third direction, wherein the power feeding portion comprises:

a first power feeding portion electrically connected to the radiating element; and a second power feeding portion electrically connected to the side member.

2. The electronic device of claim 1, wherein the gap region comprises a first gap region which is formed as at least a portion of the side member is segmented, and wherein the radiating element comprises a first radiating element positioned on a side toward the first direction with respect to the PCB.

3. The electronic device of claim 2, wherein, when the electronic device is viewed in the third direction, an end portion of the first radiating element overlaps the first gap region.

4. The electronic device of claim 3, further comprising:

a display disposed inside the housing and at least a portion of the display being exposed through the first plate, wherein, when the electronic device is viewed in the first direction, at least a first portion of the first radiating element overlaps a bezel region of the display.

5. The electronic device of claim 4, wherein the first radiating element performs radiation through the first gap region and radiation through the bezel region of the display.

6. The electronic device of claim 1, wherein the radiating element is electrically connected to the power feeding portion or the grounding portion through a connecting member.

7. The electronic device of claim 1, wherein the radiating element is electrically connected to a metal component disposed inside the housing.

8. An electronic device comprising:

a housing including a first plate facing a first direction, a second plate facing a second direction opposite to the first direction, and a side member formed facing a third direction to surround a space between the first plate and the second plate;

a gap region formed by spacing apart or segmenting at least a portion of the housing;

a printed circuit board (PCB) disposed inside the housing;

an antenna structure including a power feeding portion and a grounding portion, at least a portion of the antenna structure being electrically connected to the PCB; and a radiating element electrically connected to the power feeding portion or the grounding portion, the radiating element being positioned such that at least a portion of the radiating element overlaps the gap region when the electronic device is viewed in the first direction, the second direction, or the third direction, wherein the gap region comprises a second gap region formed as the second plate and the side member are spaced apart from each other, and wherein the radiating element comprises a second radiating element positioned on a side toward the second direction with respect to the PCB.

9. The electronic device of claim 8, wherein, when the electronic device is viewed in the second direction, at least a second portion of the second radiating element overlaps the second gap region.

10. The electronic device of claim 9, wherein the second portion is positioned parallel to the second gap region.

11. The electronic device of claim 10, wherein the second portion extends along a longitudinal direction of the second gap region.

12. The electronic device of claim 10, wherein a width of the second portion is smaller than a width of the second gap region.

13. The electronic device of claim 10, wherein the second gap region is filled with a molded portion, and wherein the second portion is bonded to and supported by the molded portion.

14. The electronic device of claim 9, wherein the second radiating element performs radiation through the second gap region and radiation through coupling with the second plate.

* * * * *